United States Patent [19]
Brandin et al.

[11] Patent Number: 6,157,617
[45] Date of Patent: Dec. 5, 2000

[54] METHOD AND SYSTEM OF NETWORK PACKET ACCOUNTING

[75] Inventors: Christopher Lockton Brandin; Robert Lewis Moore, both of Colorado Springs, Colo.

[73] Assignee: NEO-Core, L.L.C.

[21] Appl. No.: 09/127,186

[22] Filed: Jul. 31, 1998

[51] Int. Cl.[7] .............................. G06F 3/00; G06F 11/00
[52] U.S. Cl. ..................... 370/252; 370/389; 370/463; 345/348; 345/517; 709/250; 714/768
[58] Field of Search ................................. 370/252, 259, 370/389, 419, 445, 463, 468, 477, 910; 345/339, 348, 509, 515, 516, 517, 520, 521, 967, 968; 707/2, 3, 101, 102, 103, 104; 709/223, 224, 225, 226; 711/154, 161, 163, 167, 170, 202, 216; 714/752, 758, 763, 766, 768, 769

[56] References Cited

U.S. PATENT DOCUMENTS

| | | | |
|---|---|---|---|
| 5,021,949 | 6/1991 | Morten et al. | 370/389 |
| 5,608,662 | 3/1997 | Large et al. | 364/724.01 |
| 5,737,560 | 4/1998 | Yohanan | 395/349 |
| 5,742,611 | 4/1998 | Brandin | 370/473 |
| 5,745,556 | 4/1998 | Ronen | 379/127 |
| 5,818,935 | 10/1998 | Maa | 380/20 |
| 5,838,910 | 11/1998 | Domenikos et al. | 395/200.33 |
| 5,864,610 | 1/1999 | Ronen | 379/127 |
| 5,864,666 | 1/1999 | Shrader | 395/187.01 |
| 5,877,767 | 3/1999 | Yohanan | 345/357 |
| 5,929,852 | 7/1999 | Fisher et al. | 345/335 |

*Primary Examiner*—Alpus H. Hsu
*Attorney, Agent, or Firm*—Dale B. Halling

[57] ABSTRACT

A system (50) for network packet accounting includes a network interface card (52) connected to a network connection and detecting a packet. A processor (56) is connected to the network interface card (52) and extracts a network address from the packet. A transform generator (58) is connected to the processor (56) and determines an icon for the network address. An index (60) is connected to the processor (56) and relates the icon to a store location. A store (62) is connected to the processor (56) and holds a plurality of parameters related to a group at the store location.

21 Claims, 6 Drawing Sheets

METHOD AND SYSTEM OF NETWORK PACKET ACCOUNTING

FIELD OF THE INVENTION

The present invention relates generally to the field of networks and more particularly to a method and system of network and packet accounting.

BACKGROUND OF THE INVENTION

Networks that are packet switched instead of circuit switched use the network's available bandwidth more efficiently. Unfortunately, it is easier to account for the use of a dedicated circuit than for packet switched resources. Any system that accounts for the amount of bandwidth used by all customers in a packet switched network results in significantly slowing down the network. This is because every packet has to be analyzed for billing information and bandwidth usage (e.g., bytes) and it can take more time to analyze the packets than it does to transmit them. Most packet switched networks charge the customer for a fixed maximum bandwidth, whether they use this bandwidth 10% of the time or 100% of the time. This inefficient system of billing and resource allocation has reduced the deployment of packet switched networks, despite their obvious advantages.

Thus there exists a need for a system and method of network packet accounting that can account for bandwidth usage on a network without slowing down the network.

DETAILED DESCRIPTION OF THE DRAWINGS

A method and system for network packet accounting is embodied in a network accounting system. The system includes a network interface card that detects the packets on a network connection. The network interface card extracts the address and size of every packet. A processor connected to the network interface card passes the address to a transform generator. The transform generator determines an icon for the address. The processor uses the icon to determine a store location from an index. The processor then looks up a running total of the bandwidth used by the account associated with the address and adds the bandwidth (size) of the packet to the running total and stores the new running total. The network accounting system is able to perform these functions in real time due to the speed of the store (memory) look-up. The iconization of the address allows the account information to be found significantly quicker than any other method.

Figure 1:
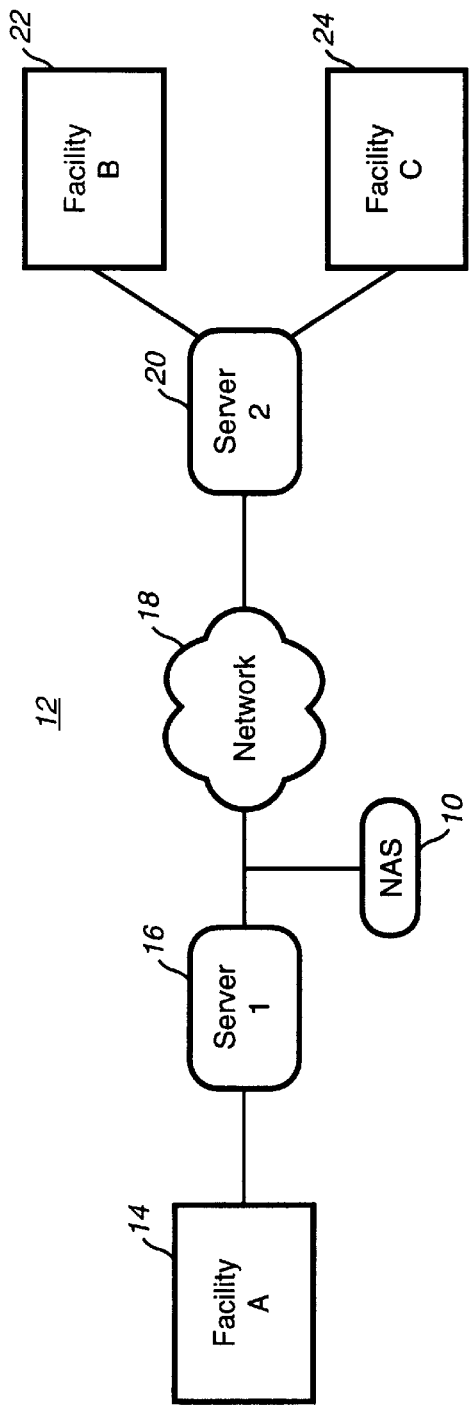
FIG. 1 is a schematic diagram of a network accounting system as used in wide area network according to one embodiment of the invention.

FIG. 1 is a schematic diagram of a network accounting system 10 as used in wide area network 12 according to one embodiment of the invention. Facility A 14 is connected to a server 16 that in turn is connected through a network 18 to a second server 20. The second server 20 connects to facility B 22 and facility C 24. Facilities A–C are part of a single company. In order to plan resources and account for various users bandwidth usage a network accounting system 10 is connected to the network connection. The network accounting system 10 keeps track of the bandwidth usage by various groups over the wide area network. This information can be used for both billing and resource allocation planning.

Figure 2:
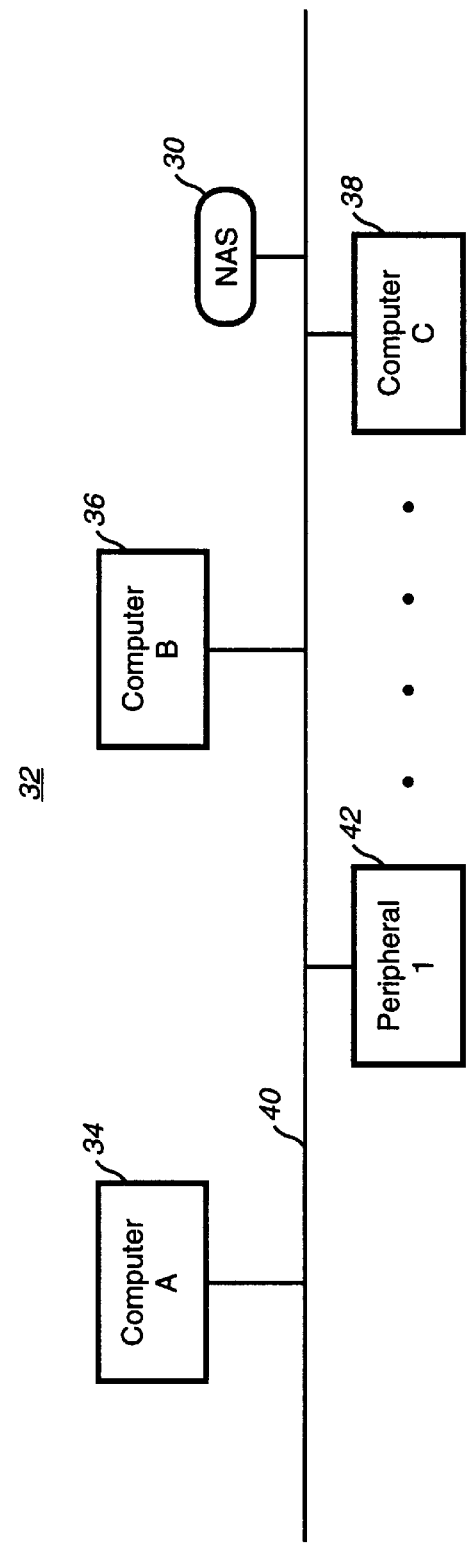
FIG. 2 is a schematic diagram of a network accounting system as used in a CSMA (Carrier Sense Multiple Access) system according to the invention.

FIG. 2 is a schematic diagram of a network accounting system 30 as used in a CSMA (Carrier Sense Multiple Access) system 32 according to the invention. This diagram shows a typical ethernet (CSMA) setup. Computer A 34, computer B 36 and computer C 38 are connected together by the ethernet connection 40. A peripheral 42 is also shown connected to the network. The network accounting system 30 keeps track of bandwidth usage on the network.

Figure 3:
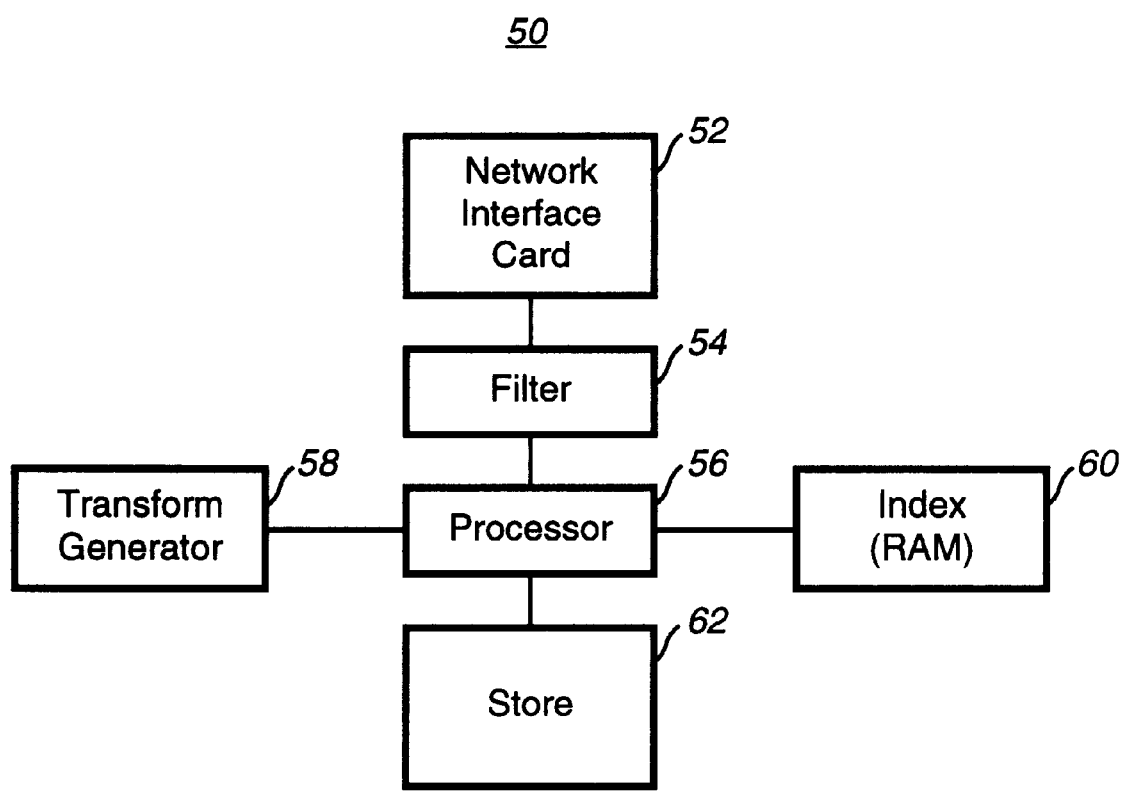
FIG. 3 is a block diagram of a network accounting system in accordance with one embodiment of the invention.

FIG. 3 is a block diagram of a network accounting system 50 in accordance with one embodiment of the invention. A network interface card 52 connects to a network connection and detects every packet transmitted over the connection. The network interface card extracts a network address (first network address) from each packet and detects a parameter associated with the packets. The parameter can be the number of bytes in the packet or quality of service indicator or type of protocol. A filter 54 can remove certain packets before they are processed. In one embodiment, no filtering is used. In another embodiment, all pings are filtered. In another embodiment, all overhead packets are removed by the filter. A processor 56 is connected to the filter 54. The processor 56 forwards the network address to a transform generator 58. In one embodiment the transform generator 58 is a linear feedback shift register (linear transformation), such as a cyclical redundancy code. The transform generator 58 determines an icon (e.g., CRC) for the network address. The icon is used by the processor to determine a store location from the index (content addressable memory) 60. In one embodiment the index is implement on a RAM chip. The processor 56 then looks up account information on a store 62 for the network address at the store location. The store 62 can be any memory device, with adequate storage and access speeds. In one embodiment the store is implemented using RAM memory chips. In another embodiment several network accounting systems are multiplexed together for high speed (e.g., >1 Gbps) network connections. In this embodiment a multiplexer is placed between the network connection and the plurality of network interface cards. A single store is accessed by each of the plurality of network accounting systems in one embodiment.

Figure 4:
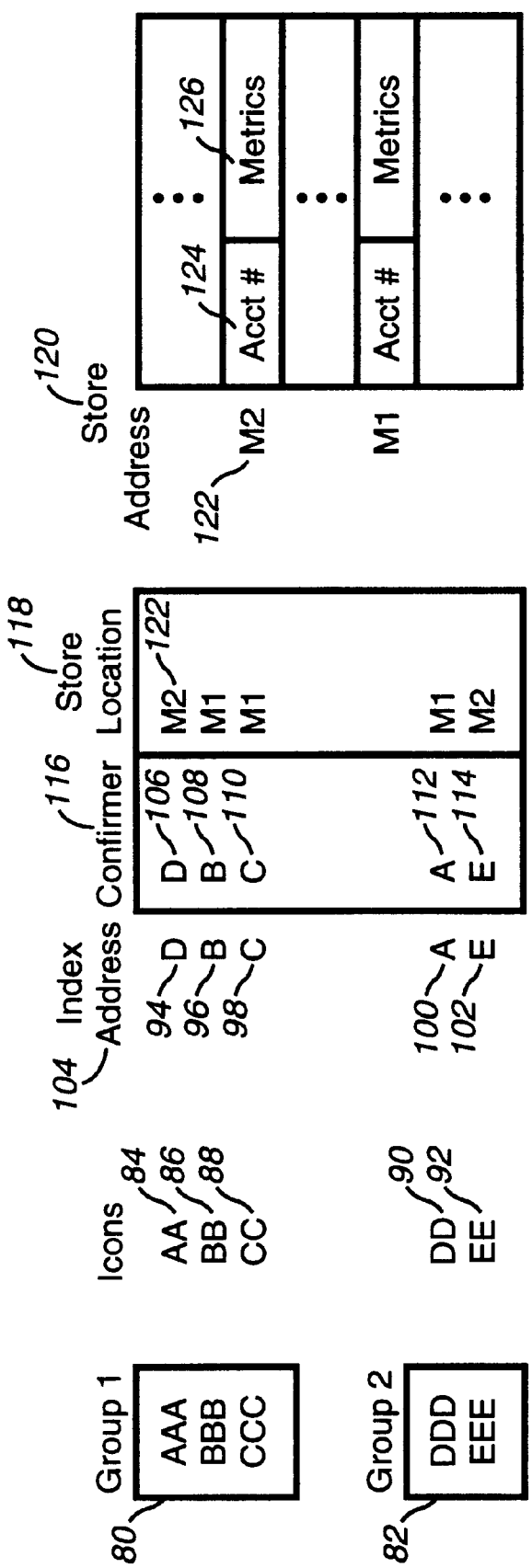
FIG. 4 is a schematic diagram of the steps used in setting up a network accounting system in accordance with one embodiment of the invention.

FIG. 4 is a schematic diagram of the steps used in setting up a network accounting system in accordance with one embodiment of the invention. In order for the network accounting system to track packet information a user must first setup a number of groups to which each of the network addresses belong. In one embodiment, a leftover group is formed for all those network addresses not in any other group. A packet may contain several addresses and the user can define which address is used for accounting purposes. Thus a user can define groups using the IP (internet protocol) address, the MAC (media access control) address, or other identifier. A first group 80 of addresses and a second group 82 of addresses are symbolically shown in the figure. Once the user has defined the groups 80, 82 the addresses are iconized to form icons 84–92. The icons in one embodiment are cyclical redundancy codes (CRCs). A portion 94–102 of the icon is used as the address 104 for the index. A second portion 106–114 is used as a confirmer 116 that is stored at the address 104. The confirmer 116 is used to resolve collisions. When a collision occurs a pointer to another address is stored at a pointer location in the index. No collisions are shown in the example and no pointers are shown. In another embodiment the complete icon is used as the address and no confirmer is used. Associated with each address is a store location 118 at one of a plurality of memory locations. The store location points to a portion of the store 120 where account information related to the address is stored. As a result, address D 94 is associated with store location M2 and all the information related to group 2 82 is stored at address M2 122. The store 62 has a plurality of store locations. The account information includes an account number 124 and a plurality of metrics 126. The metrics (parameters) can include routing metrics, number of packets transmitted, number of bytes transmitted, quality of service required for each packet (byte), time day packets were transmitted, type of protocol used. The type of protocols can include; public, private (Virtual Private Network), secure, ftp (file transfer protocol), WWW, etc.

Figure 5:
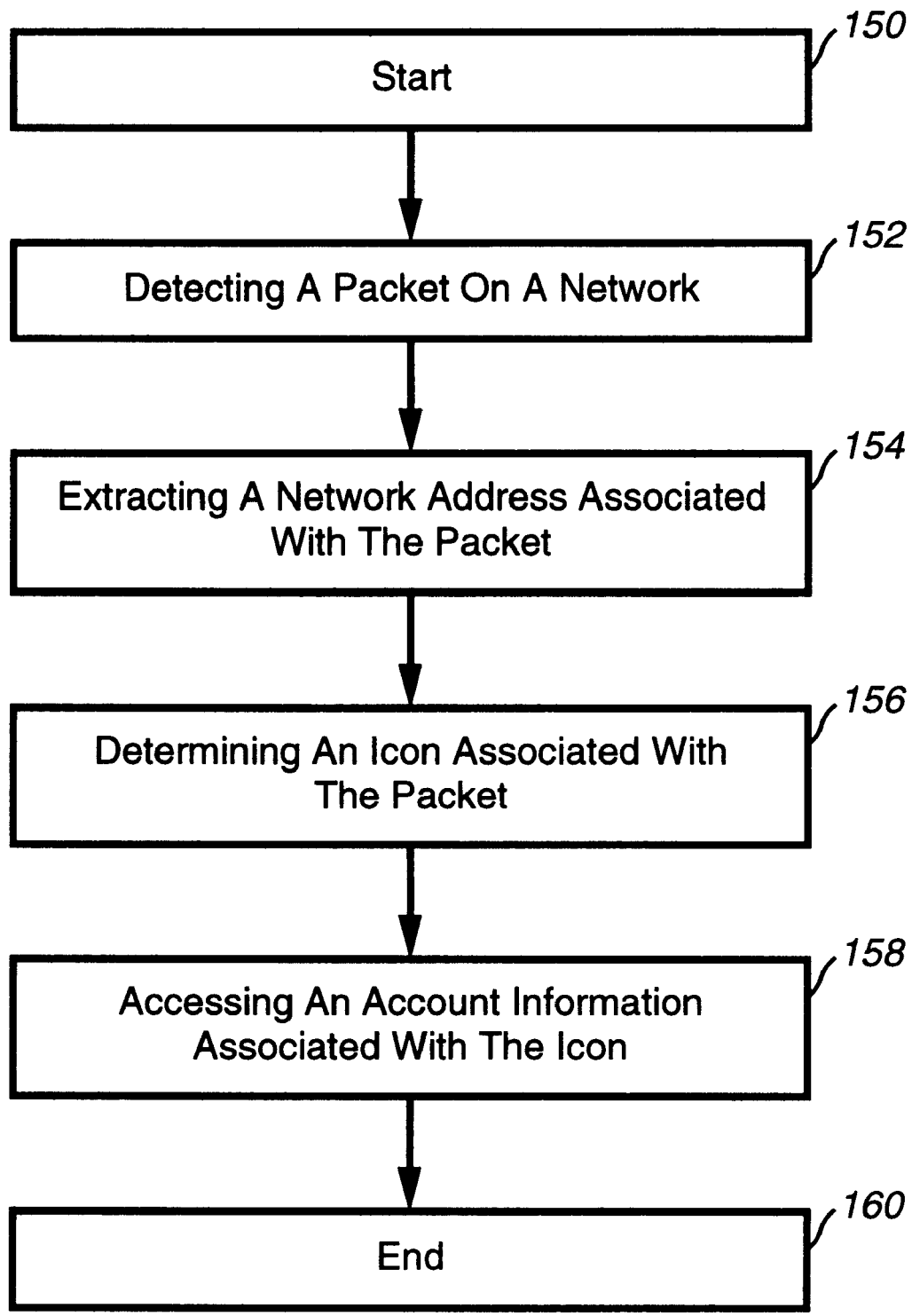
FIG. 5 is a flow chart of the steps used in a network accounting system in accordance with one embodiment of the invention.

FIG. 5 is a flow chart of the steps used in a network accounting system in accordance with one embodiment of the invention. The process starts, step 150, by detecting a packet on a network at step 152. A network address associated with the packet is extracted at step 154. An icon associated with the packet is determined at step 156. At step 158, an account information associated with the icon is accessed which ends the process at step 160.

Figure 6:
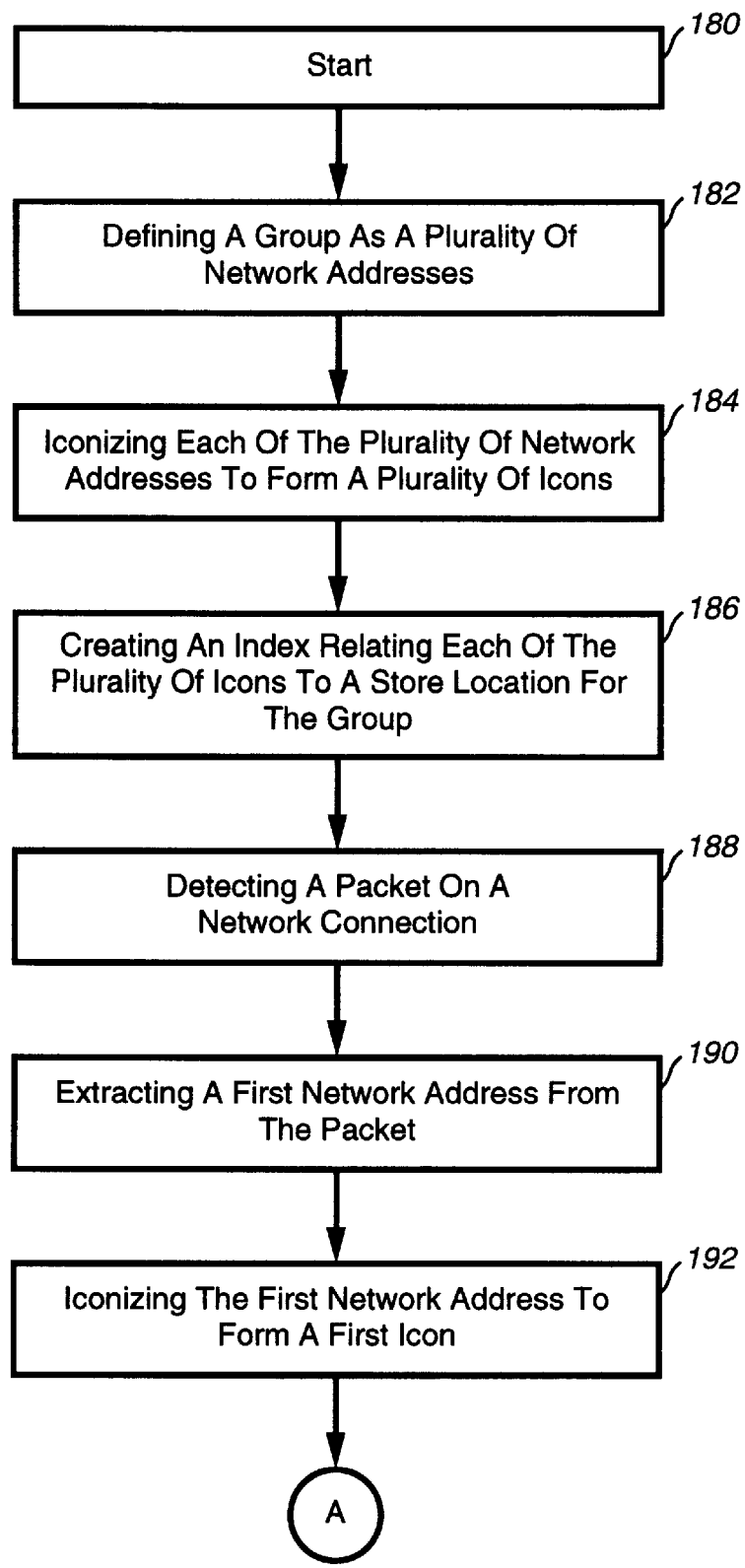
FIGS. 6 & 7 are a flow chart of the steps used in a network accounting system in accordance with one embodiment of the invention.
Figure 7:
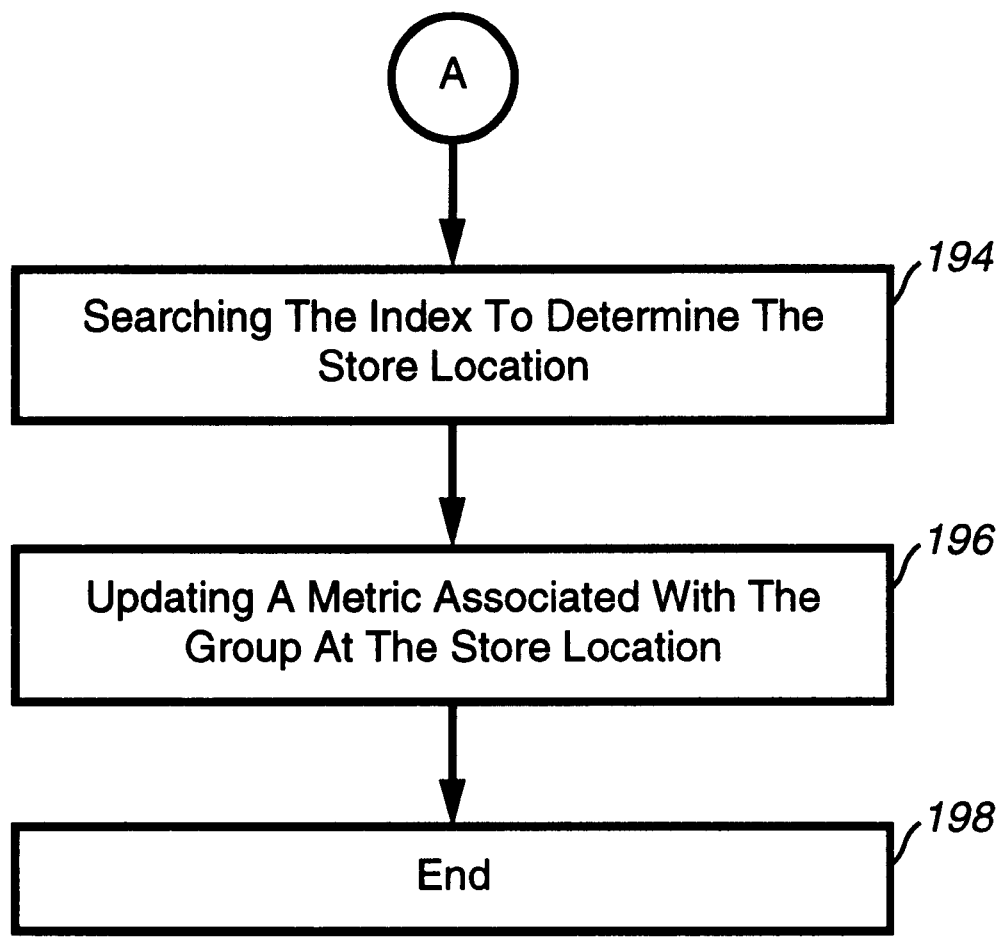

FIGS. 6 & 7 are a flow chart of the steps used in a network accounting system in accordance with one embodiment of the invention. The process starts, step 180, by defining a group as a plurality of network addresses at step 182. Each of the plurality of network addresses is iconized to form a plurality of icons at step 184. An index relating each of the plurality of icons to a store location for the groups is created at step 186. A packet is detected on the network connection at step 188. A first network address is extracted from the packet at step 190. The first network address is iconized to form a first icon at step 192. The index is searched to determine the store location at step 194. At step 196 a metric associated with the group at the store location is updated which ends the process at step 198.

The above described method and system of network packet accounting allows every packet to be counted without slowing down the network connection. A number of parameters can be tracked for each packet and resource allocation and billing can be accurately based on this information.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of network packet accounting comprising the steps of:

(a) defining a group as a plurality of network addresses;

(b) iconizing each of the plurality of network addresses to form a plurality of icons;

(c) creating an index relating each of the plurality of icons to a store location for the group;

(d) detecting a packet on a network connection;

(e) extracting a first network address from the packet;

(f) iconizing the first network address to form a first icon;

(g) searching the index to determine the store location; and (h) updating a metric associated with the group at the store location.

2. The method of claim 1, wherein step (a) further includes the step of:

(a1) defining a plurality of other groups.

3. The method of claim 2, further including the step of:

(a2) defining a leftover group as a network address not belonging to the group or any of the plurality of other groups.

4. The method of claim 1, wherein step (b) further includes the step of:

(b1) determining a cyclical redundancy code for each of the plurality of network addresses.

5. The method of claim 1, wherein step (d) further includes the step of:

(d1) detecting a parameter associated with the packet.

6. The method of claim 5, including the step of determining a number of bytes in the packet.

7. The method of claim 5, including the step of determining a quality of service indicator for the packet.

8. A system for network packet accounting comprising:

a network interface card connected to a network connection and detecting a packet;

a processor connected to the network interface card and extracting a network address from the packet;

a transform generator connected to the processor and determining an icon for the network address;

an index connected to the processor and relating the icon to a store location; and a store connected to the processor holding a plurality of parameters related to a group at the store location.

9. The system of claim 8, further including a filter connected between the network interface card and the processor.

10. The system of claim 8, wherein the network interface card determines a number of bytes in the packet.

11. The system of claim 8, wherein the transform generator performs a linear transformation of the network address to determine the icon.

12. The system of claim 8, wherein the transform generator determines a cyclical redundancy code of the network address.

13. The system of claim 8, wherein the index has a plurality of memory locations and the address of one of the plurality of memory locations is a portion of the icon.

14. The system of claim 8, wherein the store has a plurality of store locations.

15. The system of claim 14, wherein each of the plurality of store locations includes an account number and the plurality of parameters associated with the account number.

16. The system of claim 15, wherein the parameters include a number of bytes.

17. A method of network packet accounting comprising the steps of:

(a) detecting a packet on a network;

(b) extracting a network address associated with the packet;

(c) determining an icon using a transform generator, wherein the icon is associated with the packet; and (d) accessing an account information associated with the icon.

18. The method of claim 17, further including the step of:

(e) updating a parameter of the account information.

19. The method of claim 17, wherein step (a) further includes the step of:

(a1) associating a plurality of network addresses with an account number.

20. The method of claim 19, further including the step of:

(a2) calculating an icon for each of the plurality of network addresses to form a plurality of icons.

21. The method of claim 20, further including the step of:

(a3) creating an index that has a plurality of addresses, each of the plurality of icons having a portion that is the same as one of the plurality of address;

(a4) storing a memory location in each of the plurality of addresses.

* * * * *